United States Patent [19]

Lin

[11] Patent Number: 5,632,943

[45] Date of Patent: May 27, 1997

[54] METHOD FOR MANUFACTURING A DIAPHRAGM OF A SPEAKER

[76] Inventor: Po-tsung Lin, No. 43, Shanshe Rd., Shenkang Hsiang, Taichung Hsien, Taiwan

[21] Appl. No.: 407,295

[22] Filed: Mar. 20, 1995

[51] Int. Cl.⁶ .................. B29C 70/02; B29C 70/46
[52] U.S. Cl. .................. 264/103; 264/137; 264/161; 264/257; 264/291; 264/324
[58] Field of Search ................ 264/103, 137, 264/161, 257, 291, 320, 324

[56] References Cited

U.S. PATENT DOCUMENTS

| | | | |
|---|---|---|---|
| 4,919,859 | 4/1990 | Suda | 264/137 X |
| 5,047,191 | 9/1991 | Baitcher et al. | 264/257 X |
| 5,330,695 | 7/1994 | Seeler | 264/320 X |

Primary Examiner—Leo B. Tentoni

[57] ABSTRACT

A method of manufacturing a diaphragm of a speaker includes the steps of: 1. weaving a plurality of fibers to become a fiber sheet; 2. immersing the fiber sheet in resins; 3. spraying or inserting an enforcement material to the fiber sheet to form a combination sheet; 4. rolling the combination sheet into a flat pattern and therefore creating a tension therein; 5. drying the combination sheet, 6. putting said combination sheet into a mold and applying a high temperature thereto under a high pressure to form a cup-like configuration and 7. cutting the combination sheet into a desired configuration.

6 Claims, 2 Drawing Sheets

METHOD FOR MANUFACTURING A DIAPHRAGM OF A SPEAKER

BACKGROUND OF THE INVENTION

The present invention relates to a method for manufacturing a diaphragm and more particularly, to a method for manufacturing a diaphragm by steps of weaving a plurality of fibers to become a fiber sheet, immersing the diaphragm sheet into resins, spaying or inserting enforcement material to the fiber sheet to form a combination sheet, rolling the diaphragm sheet, drying the combination sheet, molding the combination sheet and cutting it into a desired configuration.

A conventional diaphragm of a speaker is made of paper, vibratability of which tends to change due to a circumstance of high humidity, and furthermore, the diaphragm made of paper has a weak structure and tends to be broken easily. A new way for manufacturing the diaphragm of a speaker is to manufacture it from p.p. (polypropylene), however, such a diaphragm cannot bear a large wattage output and has noticeable noise occurring especially when a high sound volume is delivered, furthermore, the p.p. is a soft material such that the diaphragm made thereof tends to have an non-uniform thickness and therefore cannot provide a perfect sound.

The present invention intends to provide a method of manufacturing a diaphragm of a speaker, which comprises seven steps and the diaphragm is made of a plurality of fibers and resins so as to mitigate and/or obviate the above-mentioned problems.

SUMMARY OF THE INVENTION

The present invention provides a method of manufacturing a diaphragm of a speaker and comprises the steps of: 1. weaving a plurality of fibers to become a fiber sheet; 2. immersing the fiber sheet in resins; 3. spraying or inserting an enforcement material to the fiber sheet to form a diaphragm sheet; 4. rolling the combination sheet into a flat pattern and therefore creating a tension therein; 5. drying the combination sheet, 6. putting the combination sheet into a mold and applying a high temperature under a high pressure to form a cup-like configuration and 7. cutting the combination sheet into a desired configuration.

It is an object of the present invention to provide a diaphragm of a speaker, which is made of a plurality of fibers and resins and is rolled to create a tension therein such that the diaphragm has a wide sound range.

It is another object of the present invention to provide a diaphragm of a speaker to have a longer life term.

It is a further object of the present invention to provide a diaphragm having certain functions by different weaving directions of the fibers.

Other objects, advantages, and novel features of the invention will become more apparent from the following detailed description when taken in conjunction with the accompanying drawings.

DETAILED DESCRIPTION OF THE PREFERRED EMBODIMENTS

Figure 1:
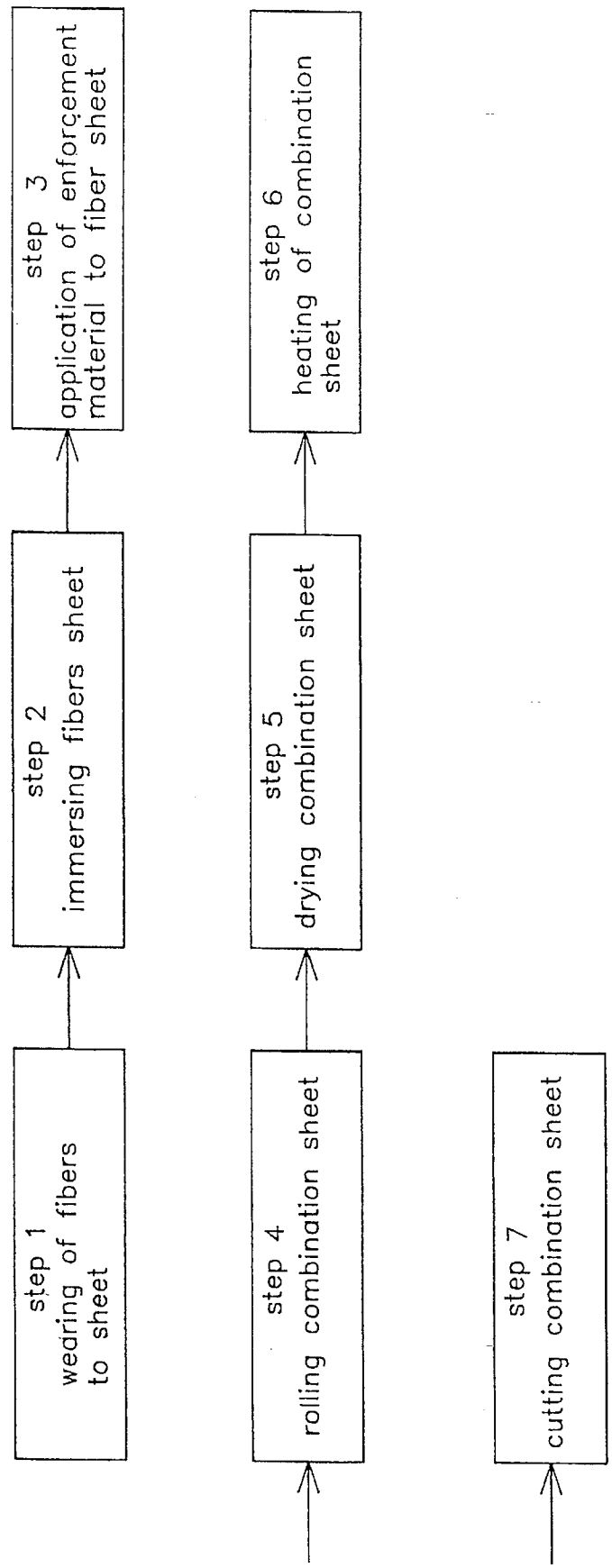
FIG. 1 is a flow chart of the steps of manufacturing a diaphragm of a speaker in accordance with the present invention.
Figure 2:
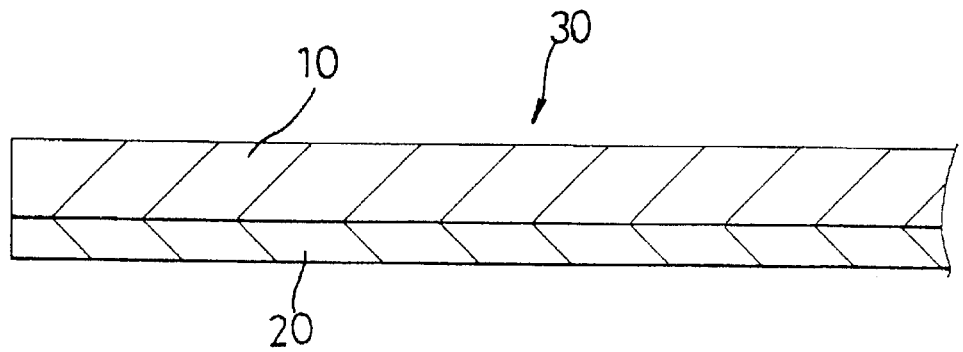
FIG. 2 is a side elevational view in section of a combination sheet which is composed of the fiber sheet engaged to an enforcement layer.

Referring to the drawings and initially to FIGS. 1 and 2, a method for manufacturing a diaphragm of a speaker in accordance with the present invention generally includes seven steps which are:

1. weaving a plurality of fibers to be a fiber sheet 10, wherein the fibers can be selectably woven in predetermined directions and thicknesses from glass fiber, carbon fiber, KEVLAR aramid fiber, nylon fiber and cotton fiber;

2. immersing the fiber sheet 10 into resins for 5 to 15 seconds, the resins comprising phenol formaldehyde, polyester resin and epoxide;

3. spraying or inserting an enforcement material to the fiber sheet 10, the enforcement material comprises forming agent, hollow particles, honeycomb particles or $CaCO_3$, in this embodiment, the enforcement material is sprayed to an under side of the fiber sheet 10 and formed as an enforcement layer 20, the combination of the fiber sheet 10 and the enforcement layer 20 is termed combination sheet 30 hereinafter;

4. rolling the combination sheet 30 to be a flat pattern so as to create a tension therein;

5. drying the combination sheet 30 at a temperature of 80 to 150 degrees Centigrade for 3 to 5 minutes to dry the enforcement layer 20 thereof;

6. putting the combination sheet 30 into a mold and heated it at 135 to 180 degrees Centigrade under a pressure of 10 to 40 $Kg/cm^2$ for 0.5 to 5 minutes to form a cup-like configuration, and 7. cutting the combination sheet 30 into a desired configuration.

Accordingly, the method has the following advantages:

1. the method is performed easily and quickly, the diaphragm made therefrom can be designed to have different configurations;

2. the functions of the diaphragm can be controlled by weaving the fibers in different directions;

3. the diaphragm is not influenced by humidity.

Figure 3:
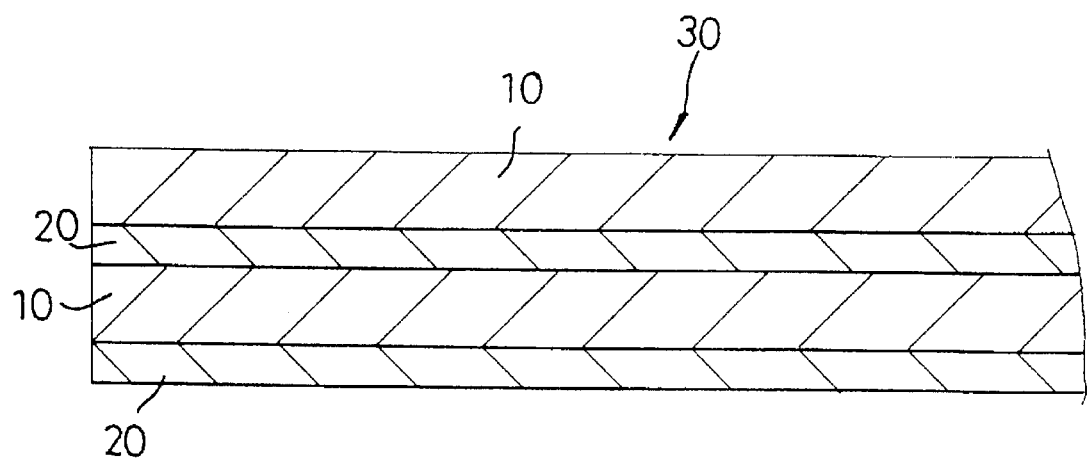
FIG. 3 is a side elevational view in section of another embodiment of the combination sheet composed of two fiber sheets and two enforcement layers.

It is noted that the combination sheet 30 can be made of a plurality of layers of fiber sheets 10 and enforcement layers 20 as shown in FIG. 3 to meet a certain predetermined function.

Although the invention has been explained in relation to its preferred embodiment, it is to be understood that many other possible modifications and variations can be made without departing from the spirit and scope of the invention as hereinafter claimed.

I claim:

1. A method of manufacturing a diaphragm of a speaker and comprising the following steps:
   1. weaving a plurality of fibers to be a fiber sheet;
   2. immersing said fiber sheet into resins;
   3. spraying or inserting an enforcement material to said fiber sheet to form a combination sheet;
   4. rolling said combination sheet to create a tension therein;
   5. drying said combination sheet,
   6. putting said combination sheet into a mold and applying a high temperature thereto under a high pressure to form a cup-like configuration, and
   7. cutting said combination sheet into a diaphragm with a desired configuration.

2. The method as claimed in claim 1 wherein said fibers comprise glass fibers, carbon fibers aramid fibers, nylon fibers or cotton fibers.

3. The method as claimed in claim 1 wherein said resins comprise phenol formaldehyde, polyester resin and epoxides.

4. The method as claimed in claim 1 wherein said enforcement material comprises foam agent, hollow particles, honeycomb particles or CaCO3.

5. The method as claimed in claim 1 wherein said fiber sheet is immersed into said resins for 5 to 15 seconds.

6. The method as claimed in claim 1 wherein said combination sheet is dried at 80–150 degrees Centigrade for 5 minutes.

* * * * *